United States Patent
Agrawal et al.

(10) Patent No.: US 10,116,644 B1
(45) Date of Patent: Oct. 30, 2018

(54) NETWORK ACCESS SESSION DETECTION TO PROVIDE SINGLE-SIGN ON (SSO) FUNCTIONALITY FOR A NETWORK ACCESS CONTROL DEVICE

(71) Applicant: Pulse Secure, LLC, San Jose, CA (US)

(72) Inventors: Ankur Agrawal, Bangalore (IN); Chandrasekaran Rajagopalan, Bangalore (IN)

(73) Assignee: Pulse Secure, LLC, San Jose, CA (US)

( * ) Notice: Subject to any disclaimer, the term of this patent is extended or adjusted under 35 U.S.C. 154(b) by 0 days.

(21) Appl. No.: 15/666,804

(22) Filed: Aug. 2, 2017

Related U.S. Application Data

(62) Division of application No. 14/228,734, filed on Mar. 28, 2014, now Pat. No. 9,729,539.

(51) Int. Cl.
*H04L 29/06* (2006.01)

(52) U.S. Cl.
CPC ................. *H04L 63/0815* (2013.01)

(58) Field of Classification Search
None
See application file for complete search history.

(56) References Cited

U.S. PATENT DOCUMENTS

| | | |
|---|---|---|
| 7,184,437 B1 | 2/2007 | Cole et al. |
| 7,197,549 B1 | 3/2007 | Salama et al. |
| 7,788,345 B1 | 8/2010 | Sukiman et al. |
| 8,321,567 B1 | 11/2012 | Sheth |
| 8,443,435 B1 | 5/2013 | Schroeder |
| 8,627,493 B1 | 1/2014 | Chickering et al. |
| 8,776,209 B1 | 7/2014 | Kumar et al. |
| 9,491,175 B2 | 11/2016 | Oberheide et al. |
| 9,729,539 B1 | 8/2017 | Agrawal et al. |
| 2002/0042868 A1 | 4/2002 | Godtland et al. |
| 2004/0160958 A1 | 8/2004 | Oh |
| 2006/0117104 A1 | 6/2006 | Taniguchi et al. |
| 2010/0064134 A1 | 3/2010 | Gross et al. |
| 2010/0082979 A1 | 4/2010 | Edwards et al. |

(Continued)

FOREIGN PATENT DOCUMENTS

JP     2012054729 A     3/2012

OTHER PUBLICATIONS

"Assertions and Protocols for the Oasis Security Assertion Markup Language (SAML) V2.0," OASIS, saml-core-2.0-os, OASIS Standard, Mar. 15, 2005, 86 pp.

(Continued)

*Primary Examiner* — Jeffery L Williams
(74) *Attorney, Agent, or Firm* — Shumaker & Sieffert, P.A.

(57) ABSTRACT

This disclosure describes techniques for verifying the identity of a user with a network access control (NAC) device in response to receiving a security assertion request for the user. To verify the identity of a user, an NAC device may, in response to receiving a security assertion request from a user agent executing on a client device, cause the user agent to redirect a session verification request to an NAC client executing on the client device. The NAC client may detect the session verification request, and provide information indicative of a valid network access session for the user to the NAC device. The NAC device may verify the identity of the user based on the information indicative of the valid network access session. In this way, an NAC device may verify the identity of a user without requiring the user to re-authenticate with the NAC device.

2 Claims, 8 Drawing Sheets

(56) References Cited

U.S. PATENT DOCUMENTS

| | | |
|---|---|---|
| 2011/0153854 A1 | 6/2011 | Chickering |
| 2012/0002815 A1 | 1/2012 | Wei et al. |
| 2012/0163196 A1 | 6/2012 | Jansen et al. |
| 2013/0007867 A1 | 1/2013 | Sowatskey et al. |
| 2015/0058960 A1 | 2/2015 | Schmoyer et al. |
| 2015/0188906 A1 | 7/2015 | Minov et al. |
| 2015/0254450 A1 | 9/2015 | Ravi et al. |
| 2016/0149898 A1 | 5/2016 | Parla et al. |
| 2016/0277390 A1 | 9/2016 | Minov et al. |

OTHER PUBLICATIONS

"Authentication Context for the OASIS Security Assertion Markup Language (SAML) V2.0," OASIS, saml-authn-context-2.0-os, OASIS Standard, Mar. 15, 2005, 70 pgs.

"Juniper Networks Secure Access Administration Guide, Release 7.0, Revision 2" Juniper Networks, Inc., Oct. 13, 2011, 1076 pgs.

"SAML Single Sign-On (SSO) Service for Google Apps," Google, Inc., Google Apps—Google Code, accessed Mar. 9, 2012, 3 pgs.

"Security Assertion Markup Language (SAML) V2.0 Technical Overview," OASIS, Committee Draft 02, OASIS Standard, Mar. 25, 2008, 51 pgs.

Al-Khayatt et al., "Performance of Multimedia Applications with IPSec Tunneling," IEEE, Proceedings of the International Conference on Information Technology: Coding and Computing (ITCC'02), Apr. 8-10, 2002, 5 pp.

"Security Access Markup Language (SAML), Integration", Release 4.1 Beta, Revision B, Juniper Networks, Inc., May 10, 2004, 22 pp.

IEEE, "802.1X™ IEEE Standard for Local and Metropolitan area networks, Post-Based Network Access Control," IEEE Computer Society, Dec. 13, 2004, 179 pp.

Kent et al., "Security Architecture for the Internet Protocol," RFC 2401, Network Working Group, Nov. 1998, 66 pp.

Prosecution History from U.S. Appl. No. 14/228,734, dated Jul. 28, 2016 through Apr. 12, 2017, 34 pp.

NETWORK ACCESS SESSION DETECTION TO PROVIDE SINGLE-SIGN ON (SSO) FUNCTIONALITY FOR A NETWORK ACCESS CONTROL DEVICE

This application is a divisional of U.S. application Ser. No. 14/228,734, filed Mar. 28, 2014, the entire contents of which are hereby incorporated by reference.

TECHNICAL FIELD

The invention relates to computer networks, and particularly to security techniques for use in computer networks.

BACKGROUND

Enterprises and other organizations implement network access control in order to control the ability of endpoint devices to communicate on a computer network. For example, an enterprise may implement a computer network that includes an email server. In order to prevent unauthorized users from communicating with this email server, the enterprise may implement a network access control system that prevents unauthorized users from sending network communications on the computer network unless the users provide a correct username and password. In another example, an enterprise may wish to prevent devices that are infected with computer viruses from communicating with devices on a network of the enterprise. In this example, the enterprise may implement a network access control system that prevents devices that do not have current anti-virus software from communicating on the network.

Enterprises may, in some examples, use the 802.1X protocol to implement network access control. Three separate types of devices are typically present in networks that implement network access control using the 802.1X protocol. These devices typically include supplicant devices, policy decision points, and policy enforcement points. Supplicant devices are devices that are attempting to connect to the network and may be referred to as endpoint devices. Policy decision points evaluate information from the supplicant devices in order to decide whether to grant the supplicant devices access to a network. An example of a policy decision point may include an authentication server. Policy enforcement points enforce the decisions made by the policy decision points with regard to individual supplicant devices. One example of a policy enforcement point is layer two (L2) switch or access point.

To gain access to protected network resources, a client executing on an endpoint device may establish a network access session with a network access control server executing on a network access control device. To establish the network access session, the client may issue a request to establish a network session to the network access control server and/or issue a request for one or more protected network resources on the network. The network access control server may authenticate the identity of users (e.g., based on one or more security credentials (e.g., a username/password combination)) and grant access to authenticated users that satisfy the security policy implemented by the network access control server. In some cases, the security policy may grant access to all authenticated users. In other cases, the security policy may grant access to authenticated users that meet other security requirements, such as user role requirements and/or endpoint device security requirements (e.g., health requirements). The endpoint device security requirements may, for example, include information indicating whether a most current operating system patch is installed on the supplicant device, whether a most current version of anti-virus software has been installed on the supplicant device, and other information.

After the user has been authenticated and any other security policy criteria are satisfied, the network access control server may establish a network access session with the user. For example, the network access control server may issue one or more policies to one or more enforcement devices that allow the authenticated user to access one or more sets of protected resources on the network. After the network access session has been established with the user, the user may be able to request access to other protected network resources without providing further authentication credentials to the network access control server (although the user may still provide credentials to the network resources if requested by the resources).

To expand the range of software services provided by an enterprise network, an enterprise may use web-based resources (e.g. web-based applications) that are provided by third-party-managed servers which are external to the enterprise network. For example, an enterprise may use a web-based email and calendar program to provide email and calendar services for an organization. Such web-based resources typically require minimal overhead, if any, in terms of additional hardware, software and/or administration needed, thereby providing time and cost savings to the enterprise in comparison to installing and maintaining such resources on a network server or onto individual network devices.

To access such web-based resources, in some cases, a user may be required to submit authentication credentials to the web-based resource or to a third-party that provides identity services for the web-based resource even if the user has already submitted authentication credentials to establish the network access session with the network access server. Requiring the user to re-authenticate in such cases may increase the amount of time it takes for a user to access resources in the network, cause password fatigue for users, and/or increase information technology (IT) infrastructure costs in order manage multiple authentication sessions or multiple authentication credentials.

SUMMARY

This disclosure describes techniques for using network access session detection to allow a network access control (NAC) device to provide single sign-on (SSO) functionality for users who have established network access sessions with the NAC device and who attempt to access protected resources (e.g., web-based resources) that are managed by third-party service providers. For example, in response to receiving a security assertion request from a user agent executing on a client device, an NAC device may cause the user agent to redirect a session verification request to an NAC client executing on the client device. The NAC client may detect the session verification request, and provide information indicative of a valid network access session for the user to the NAC device. The NAC device may verify the identity of the user based on the information indicative of the valid network access session, and issue a security assertion that is responsive to the security assertion request. The security assertion may allow a user to access a protected resource that is managed by a third-party service provider. In this way, a NAC device may act as a single sign-on (SSO) identity provider for users that have an established a network access session with the NAC device.

In one example, this disclosure describes a method that includes receiving, with an NAC device, a security assertion request from a user agent executing on a client device. The security assertion request includes a request for a security assertion to be made by the NAC device. The security assertion indicates that a user of the user agent has been authenticated by the NAC device. The method further includes sending, with the NAC device, a redirect to the user agent in response to receiving the security assertion request. The redirect includes information indicative of the security assertion request. The method further includes selectively issuing, with the NAC device, a security assertion that is responsive to the security assertion request without requiring the user to re-authenticate with the NAC device based on whether the NAC device receives session verification information from an NAC client executing on the client device in response to sending the redirect to the user agent.

In another example, this disclosure describes a method that includes listening, with an NAC client executing on a client device, to an internet protocol (IP) address for a session verification request. The session verification request includes information indicative of a security assertion request. The security assertion request includes a request for a security assertion to be made by an NAC device. The security assertion indicates that a user has been authenticated by the NAC device. The method further includes sending, with the NAC client, a session verification message to the NAC device in response to receiving the session verification request at the IP address. The session verification message includes the information indicative of a security assertion request and session verification information that is indicative of a session that has been established between the user and the NAC device.

In another example, this disclosure describes a method that includes establishing, with an NAC client executing on a client device, a network access session between a user of a network associated with the NAC client and the NAC device. The method further includes configuring, with the NAC client, the client device to resolve a hostname to an internet protocol (IP) address in response to establishing the network access session. The method further includes listening, with the NAC client, to the IP address. The method further includes receiving, with the NAC device, a security assertion request from a user agent executing on the client device. The security assertion request includes a request for a security assertion to be made by the NAC device. The security assertion indicates that a user of the user agent has been authenticated by the NAC device. The method further includes sending, with the NAC device, a redirect to the user agent in response to receiving the security assertion request, the redirect including a session verification request that includes information indicative of the security assertion request. The redirect message specifies that the redirect message is to be redirected to the hostname. The method further includes resolving, with the client device, the hostname to the IP address. The method further includes forwarding, with the user agent executing on the client device, the session verification request included in the redirect to the IP address. The method further includes sending, with the NAC client, a session verification message to the NAC device in response to receiving the session verification request at the IP address. The session verification message includes the information indicative of the security assertion request and session verification information that is indicative of a session that has been established between the user and the NAC device. The method further includes sending, with the NAC device, a security assertion responsive to the security assertion request to the NAC client in response to receiving the session verification information from the NAC client. The method further includes forwarding, with the NAC client, the security assertion to the user agent executing on the client device.

In another example, this disclosure describes a device that includes one or more processors configured to receive a security assertion request from a user agent executing on a client device. The security assertion request includes a request for a security assertion to be made by the NAC device. The security assertion indicates that a user of the user agent has been authenticated by the NAC device. The one or more processors are further configured to send a redirect to the user agent in response to receiving the security assertion request, the redirect including information indicative of the security assertion request. The one or more processors are further configured to selectively issue a security assertion that is responsive to the security assertion request without requiring the user to re-authenticate with the NAC device based on whether the NAC device receives session verification information from an NAC client executing on the client device in response to sending the redirect to the user agent.

In another example, this disclosure describes a device that includes one or more processors configured to execute a NAC client that is configured to listen to an internet protocol (IP) address for a session verification request. The session verification request includes information indicative of a security assertion request. The security assertion request includes a request for a security assertion to be made by an NAC device. The security assertion indicating that a user has been authenticated by the NAC device. The one or more processors are further configured to send a session verification message to the NAC device in response to receiving the session verification request at the IP address. The session verification message includes the information indicative of a security assertion request and session verification information that is indicative of a session that has been established between the user and the NAC device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
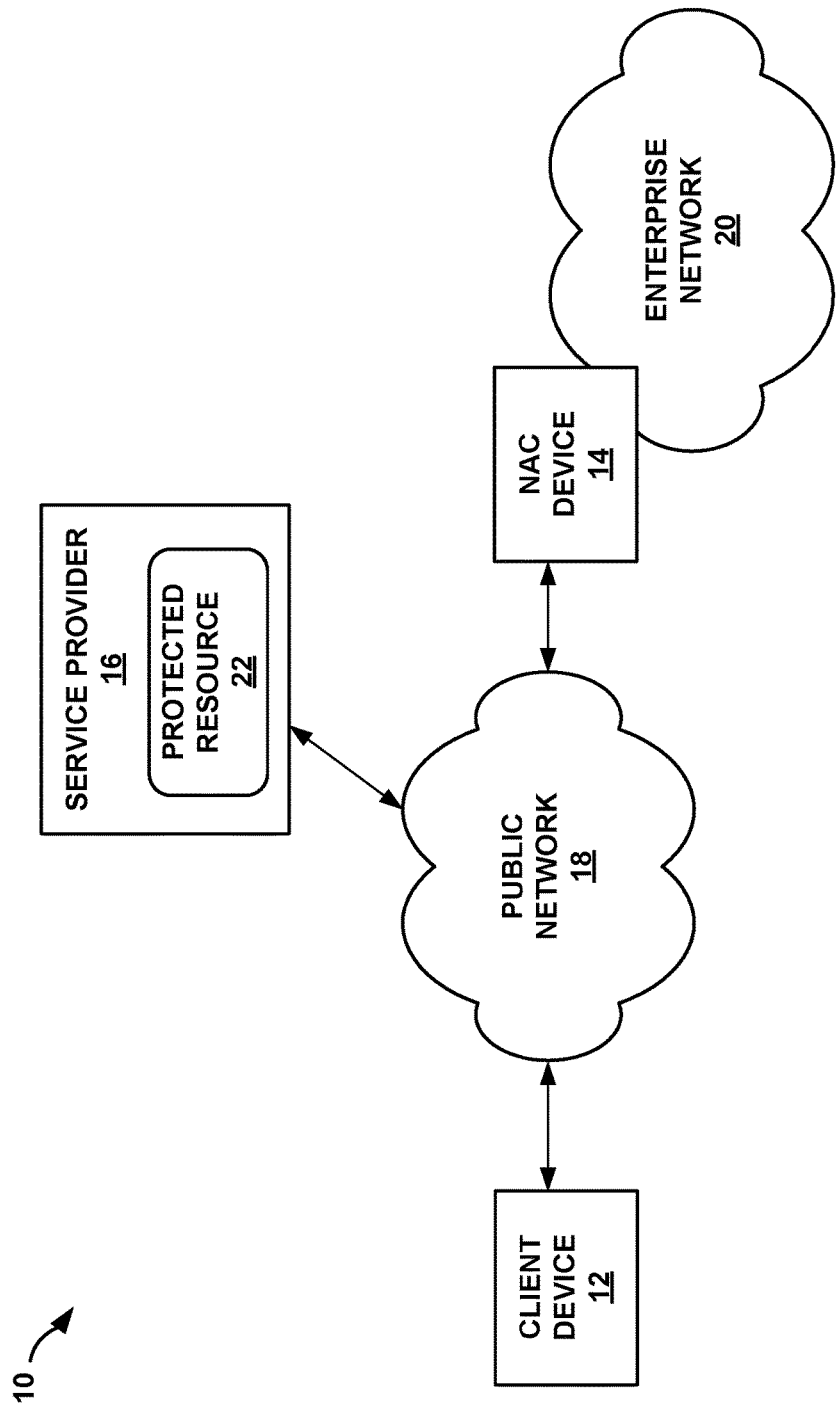
FIG. 1 is a block diagram illustrating an example network environment in which a NAC device provides network access session-based security assertions in accordance with the techniques of this disclosure.

This disclosure describes techniques for verifying the identity of a user with a network access control (NAC) device in response to receiving a single sign-on (SSO) request for the user. An NAC device may, in response to receiving a security assertion request for a user, verify the identity of the user based on whether the user associated with the security assertion request has a valid network access session established with the NAC device. A network access session may refer to a session that allows a user to access one or more protected network resources on a network associated with the NAC device. If the user has a valid network access session established with the NAC device, then the NAC device may validate the identity of the user without requiring the user to re-authenticate with the NAC device. In this way, an NAC device may provide SSO functionality to users who have established network access sessions with the NAC device and attempt to access protected resources managed by third parties.

In some examples, to determine whether a user associated with a security assertion request has a valid network access session established with an NAC device, the NAC device may, in response to receiving a security assertion request from a browser executing on a client device, send an session verification (SV) request to the browser, and cause the browser to redirect the SV request to an NAC client executing on the client device. The NAC client may detect the SV request, and provide information indicative of a valid network access session for the user to the NAC server. The NAC server may verify the identity of the user based on the information indicative of the valid network access session. In this way, an NAC device may determine whether a user associated with a security assertion request has a valid network access session established with an NAC device without requiring the user to re-authenticate with the NAC device.

In some examples, to cause the browser to redirect the SV request to the NAC client, the NAC device may provide an alternate hostname to the NAC client when a network access session is established for the user. The NAC client may generate a host file entry that maps the alternate hostname to an internet protocol (IP) address, and listen to the IP address. In some examples, the IP address may be a loopback address. The NAC device may, in response to receiving the security assertion request, send a redirect to the browser that contains the SV request and that specifies the alternate hostname as the destination for the redirect. The browser may resolve the alternate hostname to the IP address, and the NAC client may detect the SV request. Causing an alternate hostname to be resolved by a browser to an IP address that is listened to by the NAC client may allow the NAC client to be informed of the SV request without requiring a browser plug-in or other browser extensions to be used to inform the NAC client of the SV request. In this way, an NAC device may provide SSO functionality to users who have established network access sessions with the NAC device without requiring modifications to the browser executing on the client device.

In some examples, a NAC device may act as an identity provider for a third-party service provider that manages and controls access to one or more protected resources (e.g., web-based resources). In order to grant access to the protected resources, the third-party service provider may rely on security assertions issued by the NAC device that confirm that a user has properly authenticated with the NAC device. For example, a user may request access to the protected resource that is managed by the third-party service provider, and the third-party service provider may redirect the user to the NAC device to obtain a security assertion that confirms that the user has been authenticated by the NAC device.

One solution for allowing a NAC device to act as an identity provider is to have the NAC device authenticate a user associated with a security assertion request each time a security assertion request is received by the NAC device. If the user has already established a network access session with the NAC device, however, this may require the user to re-authenticate with the NAC device when accessing resources managed by the third-party service provider. Requiring the user to re-authenticate with the NAC device may increase the amount of time it takes for a user to access resources in the network, cause password fatigue for users, and/or increase information technology (IT) infrastructure costs in order manage multiple authentication sessions.

This disclosure describes techniques for using network access session detection to allow a network access control (NAC) device to provide single sign-on (SSO) functionality for users who have established network access sessions with the NAC device and who attempt to access protected resources (e.g., web-based resources) that are managed by third-party service providers. For example, in response to receiving a security assertion request from a user agent executing on a client device, an NAC device may cause the user agent to redirect a session verification request to an NAC client executing on the client device. The NAC client may detect the session verification request, and provide information indicative of a valid network access session for the user to the NAC device. The NAC device may verify the identity of the user based on the information indicative of the valid network access session, and issue a security assertion that is responsive to the security assertion request. The security assertion may allow a user to access a protected resource that is managed by a third-party service provider. In this way, a NAC device may act as an SSO identity provider for users that have an established a network access session with the NAC device.

FIG. 1 is a block diagram illustrating an example network environment 10 in which a network access control (NAC) device provides session-based security assertions in accordance with the techniques of this disclosure. Network environment 10 includes a client device 12, an NAC device 14, a service provider 16, a public network 18 and an enterprise network 20. Service provider 16 includes protected resource 22.

In the example network environment 10 of FIG. 1, enterprise network 20 may be, for example, an enterprise network associated with an organization. Enterprise network 20 may be a public or private network that implements a network access control system to control access to one or more resources on enterprise network 20. The network access control system may control access to network resources on enterprise network 20 based on one or more security requirements for the network, which may include user identity authentication requirements, user role requirements, and/or endpoint device (e.g., client device) security requirements. Public network 18 may be an unsecure, publicly accessible network, e.g., the internet.

Client device 12 may communicate with NAC device 14 via public network 18 and/or enterprise network 20. Client device 12 may also access protected resource 22 of service provider 16 via public network 18.

In some examples, enterprise network 20 and service provider 16 may occupy different security domains. For example, enterprise network 20 may be part of a first security domain, and service provider 16 may be part of a second security domain different than the first security domain. In further examples, enterprise network 20 and service provider 16 may be associated with different domain names (e.g., different domain name system (DNS) domain names). For example, enterprise network 20 may be associated with and/or addressable by a first domain name, and service provider 16 may be associated with and/or addressable by a second domain name different than the first domain name. In additional examples, the resources provided by service provider 16 and enterprise network 20 may be managed, hosted, and/or served by different organizations. For example, protected resources in enterprise network 20 may be managed, hosted, and/or served by a first organization and protected resource 22 in service provider 16 may be managed, hosted, and/or served by a second organization different than the first organization.

Client device 12 may be any type of communication device associated with an individual user or employee (e.g., an employee of the organization that manages and hosts enterprise network 20). For example, client device 12 may be a personal computer, a personal digital assistant (PDA), a smart-phone, a laptop computer, a video-game console, an application running thereon (e.g., a web browser), or other type of computing device or application that is capable of requesting access to and consuming resources within enterprise network 20 and service provider 16.

In general, the resources included in enterprise network 20 may include web servers, application servers, database servers, file servers, software applications, web services, web applications or any other electronic resource. Because such resources are situated in enterprise network 20, such resources are typically not available to the public over public network 18. Instead, registered users of enterprise network 20 typically provide authentication credentials to access the resources in enterprise network 20. Users may access the resources in enterprise network 20 from local host devices within enterprise network 20 (e.g., from devices within the organization associated with enterprise network 20) and/or access such resources remotely from client devices, such as client device 12, via public network 18.

NAC device 14 provides NAC services to control access to protected resources on enterprise network 20 by users of enterprise network 20. In some examples, NAC device 14 may provide controlled access to resources within enterprise network 20 for client devices by establishing one or more network access sessions between remote client devices and enterprise network 20. Although NAC device 14 is illustrated as being at the edge of enterprise network 20, in other examples, NAC device 14 may be inside of enterprise network 20 or external to enterprise network 20.

In order to access resources within enterprise network 20, a user may launch a NAC client on client device 12 that authenticates client device 12 with an NAC server executing on NAC device 14. The NAC client may also negotiate any security parameters needed to establish the network access session with NAC device 14. For example, a user may provide user identity authentication credentials (e.g., a username/password) to the NAC client, which may in turn provide such credentials to the NAC server executing on NAC device 14. In additional examples, the NAC client may exchange public keys with NAC device 14, generate pairs of security associations for use by client device 12 and NAC device 14, etc. In some examples, the NAC client may execute within a browser window. For example, a browser may present a user interface that requests security credentials from the user. In additional examples, the NAC client may be a stand-alone software module that executes separate from the browser. For example, the user may launch a stand-alone application that is separate from the browser and which requests security credentials from the user.

In some examples, client device 12 (e.g., an endpoint device) may send a connection request in the 802.1X protocol to the L2 switch. This connection request may be comprised of a series of 802.1X messages that the L2 switch may forward to the authentication server. The authentication server may send responses back to the L2 switch and the L2 switch may forward these responses back to the client device 12. These 802.1X messages may include security credentials (e.g., a username and password) and information about the "health" of client device 12. This health information may, for example, include information indicating whether a most current operating system patch is installed on the supplicant device, whether a most current version of anti-virus software has been installed on the supplicant device, and other information.

Enterprises may also use other strategies to implement network access control, such as inserting firewalls between client devices and server or other network resources. In order to access the protected server resources, client device 12 provides identity information and health information to an authentication server. If the identity information and health information conform to the authentication server's authentication policies, the authentication server may provision access to server resources for client device 12 through firewalls (which may represent policy enforcement points in this strategy).

As part of the network access session establishment process, NAC device 14 may provide an alternate hostname to the NAC client executing on client device 12. The alternate hostname may be referred to herein as an session verification (SV) request hostname. In response to receiving the alternate hostname, the NAC client may generate a host file entry that maps the alternate hostname to an internet protocol (IP) address, and may configure a listener to listen for the IP address. In some examples, the IP address may be a loopback address.

Service provider 16 may be any type of computing device configured to control access to and serve protected resource 22. Protected resource 22 may be for example, a web-based resource, a web application, a web document, a word processing file, an email application, a database server, a file server, or the like. Service provider 16 may control access to protected resource 22 via a security assertion protocol. The security assertion protocol allows service provider 16 to rely upon security assertions issued by identity providers, which are sometimes in different security domains that service provider 16, to control access to protected resource 22. The security assertion may include, for example, an authentication assertion that indicates that a particular user who is requesting access to protected resource 22 has properly authenticated with the identity provider.

In the example network environment 10 of FIG. 1, service provider 16 relies upon security assertions issued by NAC device 14, which acts as an identity provider, in order to grant a user of client device 12 access to protected resource 22. The security assertion protocol may be a predetermined, pre-negotiated protocol based on a trust relationship between the organization that manages service provider 16 and the organization that manages enterprise network 20. In the context of this trust relationship, service provider 16 may be referred to as a relying party and NAC device 14 may be referred as an asserting party.

In some examples, the security assertion protocol may conform to a public and/or proprietary standard for exchanging authentication information. For example, the security assertion protocol may conform to the Security Assertion Markup Language (SAML) protocol. In general, SAML may support security assertions that allow a service provider which hosts web-based resources to use a separate identity provider in order to perform authentication and authorization of enterprise network users who attempt to access the web-based resources. For example, when a user's web browser requests access to a web-based resource, the web-based resource may redirect the browser to an identity provider to verify that the user is properly authenticated and/or authorized to use the internal resource of the enterprise. In response to the redirect, the browser may forward a security assertion request to the identity provider. After the identity provider verifies proper security credentials for the user, the identity provider may formulate a security assertion indicating that user has been properly authenticated and/or is authorized to use the resource, and send the security assertion to the user's browser. The user's browser then forwards the security assertion to the service provider, which upon receiving the security assertion, allows the user to access the protected resource. In this way, an enterprise may allow users to access web-based resources and applications while retaining full control over the authentication and authorization of the enterprise network users accessing the web-based resources.

Further details regarding the SAML protocol can be found in "Assertions and Protocols for the OASIS security Assertion Markup Language (SAML) V2.0," Organization for the Advancement of Structured Information Standards (OASIS), Mar. 15, 2005; "Authentication Context for the OASIS security Assertion Markup Language (SAML) V2.0," OASIS, Mar. 15, 2005; and "security Assertion Markup Language (SAML) V2.0 Technical Overview," OASIS, Mar. 25, 2008; the entire content of each of which is incorporated herein by reference.

Client device 12, NAC device 14, and/or service provider 16 may implement any of the techniques of this disclosure for providing session-based security assertions. For example, client device 12 may execute a NAC client that may receive an alternate hostname, configure a name resolver to resolve the alternate hostname to a loopback IP address, and listen to the loopback IP address for assertion generation (AG) requests. A user may attempt to access protected resource 22 via a web browser. Service provider 16 may detect that the user has not yet authenticated with service provider 16, and may send a redirect to the browser that includes a security assertion request (e.g., a security assertion request). The redirect may include a destination URL that corresponds to NAC device 14. In response to receiving the security assertion request, NAC device 14 may send a redirect message to the browser executing on client device 12 that includes an SV request. The redirect may include the alternate hostname.

The browser may redirect the SV request to the alternate hostname, which resolves to the loopback IP address that is monitored by the NAC client. In response to detecting the SV request, the NAC client may forward the SV request to NAC device 14 and provide information indicative of a valid network access session for the user to NAC device 14. NAC device 14 may provide a security assertion (e.g., an SSO response) to the NAC client executing on client device 12, and the NAC client may forward the response to a web browser executing on client device 12. The web browser may send the security assertion to service provider 16, which may grant the user access to protected resource 22.

Figure 2:
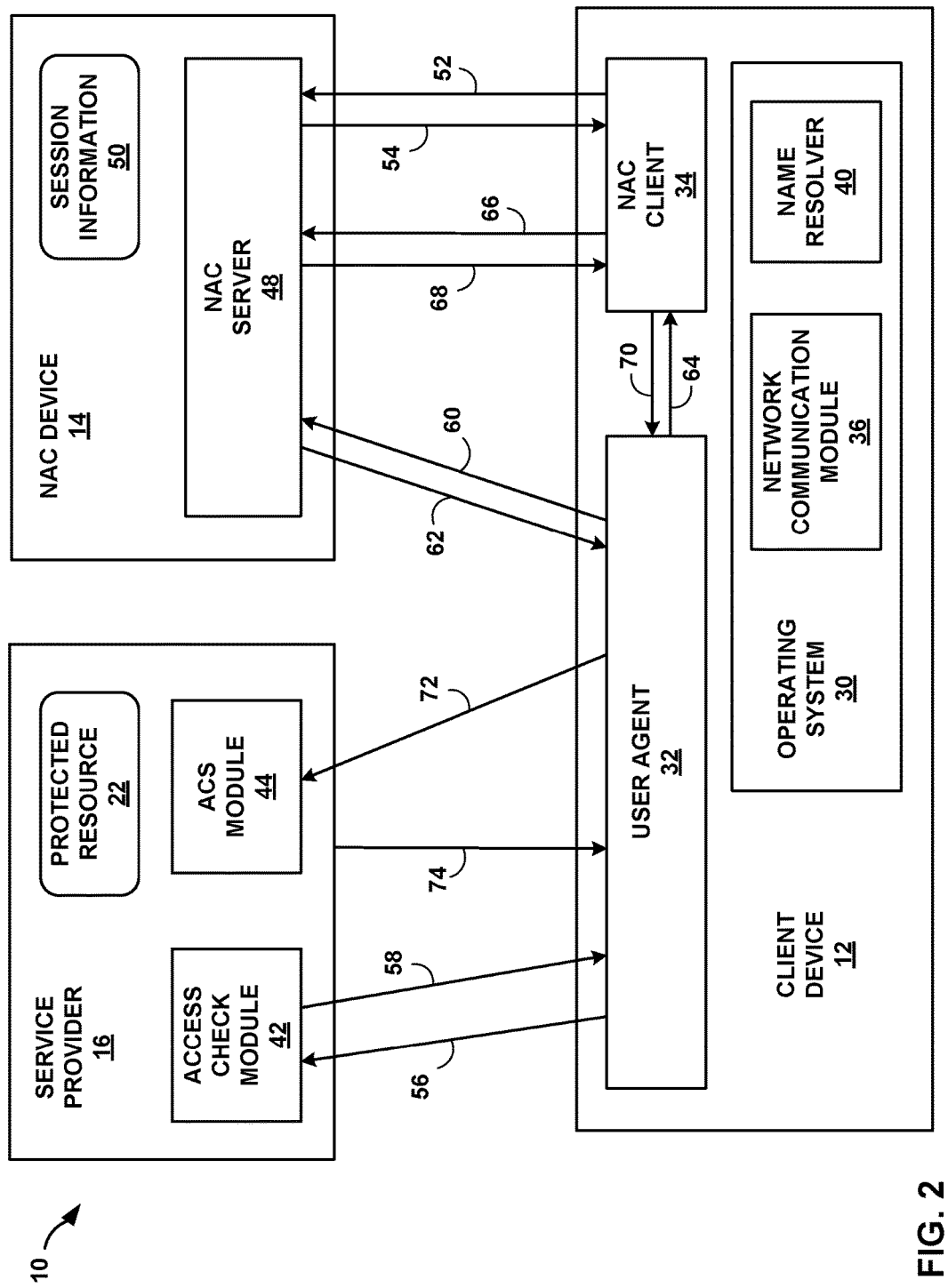
FIG. 2 is a block diagram illustrating an example implementation of the network environment of FIG. 1 in greater detail and an exemplary signal flow in which a client device authenticates with an NAC device prior to requesting access to a protected resource located on a service provider in accordance with the techniques of this disclosure.

FIG. 2 is a block diagram illustrating an example implementation of network environment 10 of FIG. 1 in greater detail and an exemplary signal flow in which client device 12 signs on to NAC device 14 prior to requesting access to protected resource 22 located on service provider 16. As shown in FIG. 2, client device 12 executes an operating system 30, a user agent 32 and an NAC client 34. Operating system 30 includes a network communication module 36 and a name resolver 40. Service provider 16 executes an access check module 42 and an Access Consumer Service (ACS) module 44. Service provider 16 includes protected resource 22. NAC device 14 executes a NAC server 48, and includes session information 50.

Client device 12 may include hardware that provides core functionality for operation of the device. The hardware may include, for example, one or more programmable microprocessors configured to operate according to executable instructions (i.e., program code), typically stored in a computer-readable medium such as a static, random-access memory (SRAM) device or a Flash memory device. The hardware may also include an input/output (I/O) subsystem that provides a network interface for communicating with public network 18. The network interface may be a wired or wireless interface, such as an Ethernet, fiber optic, token ring, modem, or other network interface. The hardware may also include additional discrete digital logic or analog circuitry. NAC device 14 and service provider 16 may also include similar hardware and I/O subsystems.

Operating system 30 executes on the hardware (e.g., one or more processors) and provides an operating environment for one or more applications. In one example, operating system 30 provides an interface layer for receiving kernel calls from user applications, such as, e.g. user agent 32 and NAC client 34. In addition, operating system 30 provides a framework within one or more of network communication module 36 and name resolver 40 operate and may, for example, allow one or more of these components to execute within a "kernel" space of the operating environment provided by client device 12.

Network communication module 36 may access name resolver 40 to resolve any hostnames for outbound communications. Name resolver 40 may resolve hostnames to corresponding IP addresses. For example, name resolver 40 may use a host table, a name cache, and/or query one or more name servers in a name system in order to resolve a received hostname to an IP address. The one or more name servers may include servers within a centralized server system or a distributed server system accessible by public network 18. In some examples, name resolver 40 may be a DNS name resolver and resolve hostnames using the DNS naming system.

In some examples, user agent 32 may be a Hypertext Transfer Protocol (HTTP) user agent. In further examples, user agent 32 may be a web-browser.

In examples where user agent 32 is a browser, the browser may be any web browser capable of allowing a user to access protected resource 22. For example, the browser may be configured to request resources using a universal resource indicator (URI) or a universal resource locator (URL). The browser may allow a user to access protected resource 22, for example, by entering a URI or URL into an address bar and/or activating a hyperlink that navigates the browser to protected resource 22. In some examples, the browser may be a web browser such as, e.g., an Internet Explorer browser, a Mozilla Firefox browser, a Safari browser, an Opera browser or the like. The browser may be configured to redirect security assertion requests and security assertions according to the techniques described herein.

NAC client 34 is configured to establish a network access session with NAC device 14. NAC client 34 may request user credentials to establish authentication and/or authorization. User credentials may include, for example, a username-password pair, a biometric identifier, data stored on a smart card, a one-time password token or a digital certificate. In some cases, NAC client 34 may present a login page for receiving credentials from the user. For example, when accessing protected resources on enterprise network 20, a user associated with client device 12 may direct a web browser executing on client device 12 to a URL associated with the enterprise. In this case, NAC client 34 may present a web page on client device 12 via user agent 32 to capture the credentials required from the user. Upon receiving the credentials from the user, NAC client 34 may present the credentials to NAC server 48 executing on NAC device 14. Based on the provided credentials, NAC server 48 may grant or deny access to protected resources on enterprise network 20 and/or establish a network access session. In some examples, NAC server 48 may communicate with an authentication, authorization and accounting (AAA) server to authenticate the credentials. The AAA server may execute on NAC device 14 or on a separate network device and may be, for example, a Remote Authentication Dial-In User Service (RADIUS) server.

Upon establishing a network access session, NAC server 48 may provide a session cookie and an alternate hostname to NAC client 34. NAC client 34 may configure name resolver 40 to resolve the alternate hostname to a loopback IP address associated with the alternate hostname. In some examples, prior to establishing the network access connection, name resolver 40 may have been configured to resolve the alternate hostname to a public IP address associated with NAC device 14.

Access check module 42 may receive security assertion requests and determine whether the requester already has an established session with service provider 16. If the user does have an established session with service provider 16, access check module 42 may grant access to protected resource 22. Otherwise, if the user does not have an established session with service provider 16, access check module 42 may redirect the requester to an identity provider, e.g., NAC device 14, to obtain a security assertion. ACS module 44 may receive security assertions from client devices (e.g., client device 12), and grant or deny users access to protected resource 22 based on the content of the security assertion. NAC server 48 may establish and manage network access sessions between NAC clients executing on client devices and NAC device 14. NAC server 48 may also manage the receipt of security assertion requests and the issuance of security assertions in response to security assertion requests. Session information 50 may store information relating to established sessions.

The operation of network environment 10 will now be described for the case where a user on client device 12 signs on to NAC device 14 prior to requesting access to protected resource 22 located on service provider 16. NAC device 14 may be associated with a standard hostname and an alternate hostname. The standard hostname may be used to access NAC device 14 for purposes other than security assertion requests, and the alternate hostname may be used for receiving redirected assertion generation (AG) requests. Prior to authenticating with NAC device 14, name resolver 40 is configured to resolve the alternate hostname to an IP address associated with NAC device 14.

NAC client 34 provides user credentials to NAC server 48 via message 52. The user credentials may be authentication credentials, such as, e.g., a username-password pair. NAC server 48 verifies the user credentials. If the user credentials are valid, NAC server 48 and NAC client 34 establish a network access session. Upon establishing the network access session, NAC server 48 provides information indicative of the session (e.g., a session cookie) to NAC client 34 via message 54. NAC server 48 also provides an alternate hostname to NAC client 34 via message 54.

NAC client 48 prepares to handle SV requests. For example, NAC client 48 may generate a host file entry in name resolver 40 that maps the alternate hostname (e.g., virtual hostname) to a loopback address, and may begin listening to the loopback address. In some examples, NAC client 48 may listen to the loopback IP address on port 443.

After establishing a network access session, a user directs user agent 32 to access protected resource 22 on service provider 16. User agent 32 sends a request 56 to access check module 42 requesting access to protected resource 22. The destination hostname for request 56 may be a hostname that is agreed upon by service provider 16 and the organization associated with NAC device 14. For example, request 56 may provide a same type of protected resource to a plurality of different organizations and each organization may access the type of protected resource via a different URL that is specific to that organization. Request 56 may include information identifying the user that is requesting the protected resource, and in some examples, information identifying the protected resource to be accessed (i.e., protected resource 22 in this example). In some examples, request 56 may be a request that conforms to a world wide web communications protocol, such as, e.g., a hypertext transfer protocol (HTTP) request.

In response to receiving request 56, access check module 42 may determine whether the user identified in request 56 already has an established session with service provider 16. Access check module 42 may determine whether a requester has an established session with service provider 16, for example, by accessing a session token or cookie placed in the requester's browser when the session was established. If the user has an established session with service provider 16, access check module 42 may grant access to protected resource 22. Otherwise, if the user does not have an established session with service provider 16, then service provider 16 determines that the user will need to be authenticated.

A prior trust agreement established between service provider 16 and the organization that manages enterprise network 20 may indicate that service provider 16 should send a redirect to client device 12 to request a security assertion from NAC device 14. Access check module 42 sends a redirect 58 to user agent 32 of client device 12. Redirect 58 may include a security assertion request (e.g., a security assertion request). The security assertion request may include one or more of following: information identifying the subject of the assertion request (i.e., the user to which the assertion request pertains), a hostname of an identity provider for servicing the request, identification of the ACS to which the security assertion should be returned, and any specific content that is required to be present in the assertion including whether a specific means of authentication is required. In some cases, the security assertion request may be referred to as an authentication request. In the example of FIG. 2, redirect 58 includes a security assertion request that specifies the user that requested access to protected resource 22 via request 56, the standard hostname associated with NAC device 14, and a hostname associated with ACS module 44. In some examples, redirect 58 may be an HTTP redirect message (e.g., HTTP Status 302 or 303) where the location header includes the standard hostname of NAC device 14 and the security assertion request is encoded as a URL query variable. The location header may be a location indicative of a destination to which the redirect should be sent.

In response to receiving redirect 58, user agent 32 may send message 60 to NAC server 48 of NAC device 14. Message 60 may include the security assertion request included in redirect 58, and may be sent to the standard hostname specified in redirect 58. In some examples, message 60 may be a HTTP GET request.

In response to receiving message 60 from user agent 32, NAC server 48 executing on NAC device 14 may generate an session verification (SV) request and send a redirect 62 to user agent 32 of client device 12. Redirect 62 may include the SV request. In some examples, the SV request may include some or all of the information fields included in the security assertion request of message 60. In further examples, redirect 62 specifies that the message should be redirected to the alternate hostname provided by NAC device 14 when the network access session for the user was established. In some examples, redirect 62 may be an HTTP redirect message (e.g., HTTP Status 302 or 303) where the location header includes the alternate hostname provided by NAC device 14 and the SV request is encoded as a URL query variable.

In response to receiving redirect 62, user agent 32 may use name resolver 40 to resolve the alternate hostname included in redirect 62. As discussed above, when the network access session was established, name resolver 40 was configured to resolve the alternate hostname to the loopback IP address that is being monitored by NAC client 34. Therefore, user agent 32 resolves the alternate hostname included in redirect 62 to the loopback IP address and sends message 64 to the loopback IP address. For example, user agent 32 may connect to NAC client 34 and send the SV request to NAC client 34. In some examples, the certificate used by NAC client 34 to perform a secure sockets layer (SSL) handshake may be installed offline or queried by NAC client 34 from NAC server 48 using a control channel between NAC client 34 and NAC server 48. Message 64 may include the SV request included in message 62 and the loopback IP address as a destination address.

NAC client 34 receives, detects, and/or intercepts message 64 via a listener that listens to the loopback IP address. In response to receiving, detecting, and/or intercepting message 64, NAC server 48 verifies that the alternate hostname in the incoming request (i.e., message 64) is the same as the alternate hostname that NAC client 34 received when the network access session was established. If the alternate hostnames are the same, NAC client 34 establishes a connection with NAC server 48 on the hostname. NAC client 34 may forward the SV request to NAC server 48 via message 66. NAC client 34 may embed information indicative of the valid network access session established with the user (e.g., a session cookie) in the SV request sent via message 66.

NAC server 48 detects the session based on the information indicative of the valid network access session established with the user (e.g., the session cookie) included in message 66. NAC server 48 associates and/or correlates the SV request receive via message 66 with the security assertion request (e.g., security assertion request) received via message 60, and generates security assertion 68 corresponding to the security assertion request received via message 60. NAC server 48 sends security assertion 68 to NAC client 34.

Security assertion 68 may include one or more statements asserting security information about a subject, which in this example is the user requesting access to protected resource 22. The one or more statements may include one or more authentication statements, one or more attribute statements, and/or one or more authorization decision statements. An authentication statement may be a statement by NAC device 14 that a particular user was authenticated by a particular authentication means at a particular time. That is, the authentication statement may be a statement indicating that the user has successfully authenticated with NAC device 14, which in this example happened when the network access session was established. The authentication statement may include, in some examples, a description of the particular means used to authenticate the user, such as, e.g., whether a password was used, whether a password protected transport mechanism was used, whether a digital signature was used, whether a digital certificate was used, and/or whether an authentication certificate was used. The authentication statement may also include, in some examples, the specific time and date that the authentication took place. The authentication statement may also include, in some examples, time-based validity conditions, such as, e.g., this security assertion is not valid prior to a particular date or time or this security assertion is not valid after a particular date or time.

An attribute statement, if included in security assertion 68, may contain specific attributes about the user, such as, e.g., particular groups within the organization in which the user is enrolled or status information about the user. An authorization decision statement, if included in security assertion 68, may define some action that the user is able to do, e.g., whether the user is able to make a purchase.

security assertion 68 may include information that identifies the user being asserted. The identity information may include, for example, an email address, an X.509 subject name, a Windows domain qualified name, a Kebros principal name, an entity identifier, a persistent identifier, a transient identifier or any other means of identifying the user. In some cases, security assertion 68 may not necessarily include identity information in which case identity may be determined through other means such as, e.g., a certificate used for subject confirmation.

In some examples, security assertion 68 may be formulated in a markup language. For example, security assertion 68 may be formulated in the Extensible Markup Language (XML). In further examples, security assertion 68 may conform to a security assertion protocol, such as, e.g., the SAML protocol. In additional examples, security assertion 68 may include the digital signature of NAC device 14 or other authentication and/or integrity information for NAC device 14.

NAC client 34 receives security assertion 68, and forwards the security assertion to user agent 32 via message 70. In examples where security assertion 68 includes a session cookie, NAC client 34 may, in some examples, remove the session cookie from security assertion 68 prior to sending message 70 to user agent 32.

User agent 32, upon receiving the security assertion via message 70, forwards the security assertion to ACS module 44 via message 72. In some examples, message 72 may be sent to a hostname specified in the original security assertion request. Message 72 may, for example, be an HTTP POST response that includes the security assertion sent by message 72.

ACS module 44 receives the security assertion via message 72, determines whether the security assertion is valid, and grants or denies the user access to protected resource 22 depending on whether the security assertion is valid. If ACS module 44 grants access to protected resource 22, ACS module 44 may, for example, allow the user to download protected resource 22 and/or present a web page in user agent 32 that allows the user to view protected resource 22 either of which may take place via one or more messages 74.

Figure 3:
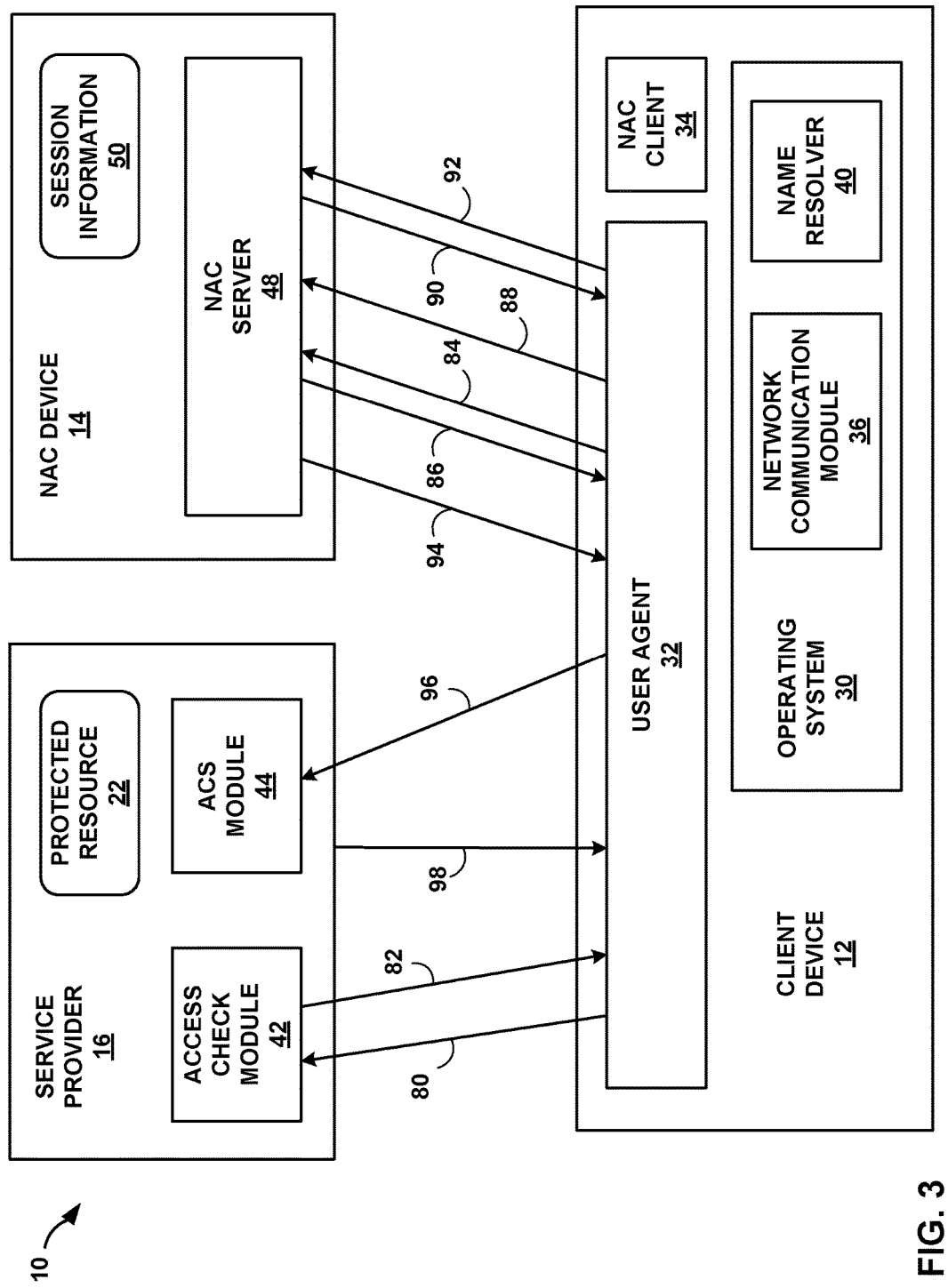
FIG. 3 is a block diagram illustrating the example network environment shown in FIG. 2 with an exemplary signal flow in which the client device requests access to the protected resource located on the service provider prior to signing on to the NAC device in accordance with the techniques of this disclosure.

FIG. 3 is a block diagram illustrating the example implementation of network environment 10 shown in FIG. 2 with an exemplary signal flow in which client device 12 requests access to protected resource 22 located on service provider 16 prior to signing on to NAC device 14. Initially, client device 12 does not have a network access session established with NAC device 14, and name resolver 40 is configured to resolve the alternate hostname to an IP address associated with NAC device 14.

A user directs user agent 32 to access protected resource 22 on service provider 16. User agent 32 sends a request 80 to access check module 42 requesting access to protected resource 22. In response to receiving request 80, access check module 42 sends a redirect 82 to user agent 32 of client device 12 if a session has not already been established between client device 12 and service provider 16. Redirect 82 includes a security assertion request that specifies the standard hostname for NAC device 14 as the identity provider to service the request. User agent 32 receives redirect 82 and sends a message 84 to NAC server 48 that includes the security assertion request included in redirect 82. Message 84 may be sent to the standard hostname specified in redirect 82. In response to receiving message 84 from user agent 32, NAC server 48 generates an SV request and sends a redirect 86 to user agent 32 of client device 12. The redirect 86 may specify that the SV request be forwarded to the alternate hostname.

Request 80, redirect 82, message 84, and redirect 86 may be substantially similar to request 56, redirect 58, message 60, and redirect 62, respectively, described above with respect to FIG. 2. Therefore, for the sake of brevity and to avoid redundancy, the content and formulation of request 80, redirect 82, message 84, and redirect 86 will not be described in further detail.

In response to receiving redirect 86, user agent 32 may use name resolver 40 to resolve the alternate hostname included in redirect 86. Name resolver 40 may resolve the alternate hostname included in redirect 86 to an IP address associated with NAC device 14, and send message 88 to NAC server 48. Because a network access session has not been established between client device 12 and NAC device 14, NAC client 34 may not be configured to listen for the IP address associated NAC device 14, and therefore may not intercept message 88. Thus, message 88 may be received by NAC server 48 executing on NAC device 14. Message 88 may include the SV request included in redirect 86.

In response to receiving the SV request via the alternate hostname, NAC server 48 may determine that there is not a valid network access session established for the user associated with the security assertion request in message 84. Therefore, NAC server 48 may authenticate the user via one or more messages 90 and 92. For example, NAC server 48 may send message 90 to user agent 32, which may present a web page requesting authentication credentials from the user. After the authentication credentials are received via the web page, user agent 32 sends message 92, which includes the authentication credentials, to NAC server 48. NAC server 48 verifies the authentication credentials, and if valid, sends security assertion 94 to user agent 32. In additional examples, NAC server 48 may use NAC client 34 to authenticate the user.

User agent 32 forwards security assertion 94 to ACS module 44 via message 96. ACS module 44 receives message 96, determines whether the security assertion included in message 96 is valid, and grants or denies the user access to protected resource 22 depending on whether the security assertion is valid. If ACS module 44 grants access to protected resource 22, ACS module 44 may, for example, allow the user to download protected resource 22 via message 98 and/or present a web page in user agent 32 that allows the user to view protected resource 22 via message 98.

Security assertion 94, message 96 and message 98 are substantially similar to security assertion 68, message 72, and message 74, respectively described above with respect to FIG. 2. Therefore, for the sake of brevity and to avoid redundancy, the content and formulation of security assertion 94, message 96 and message 98 will not be described in further detail.

Figure 4:
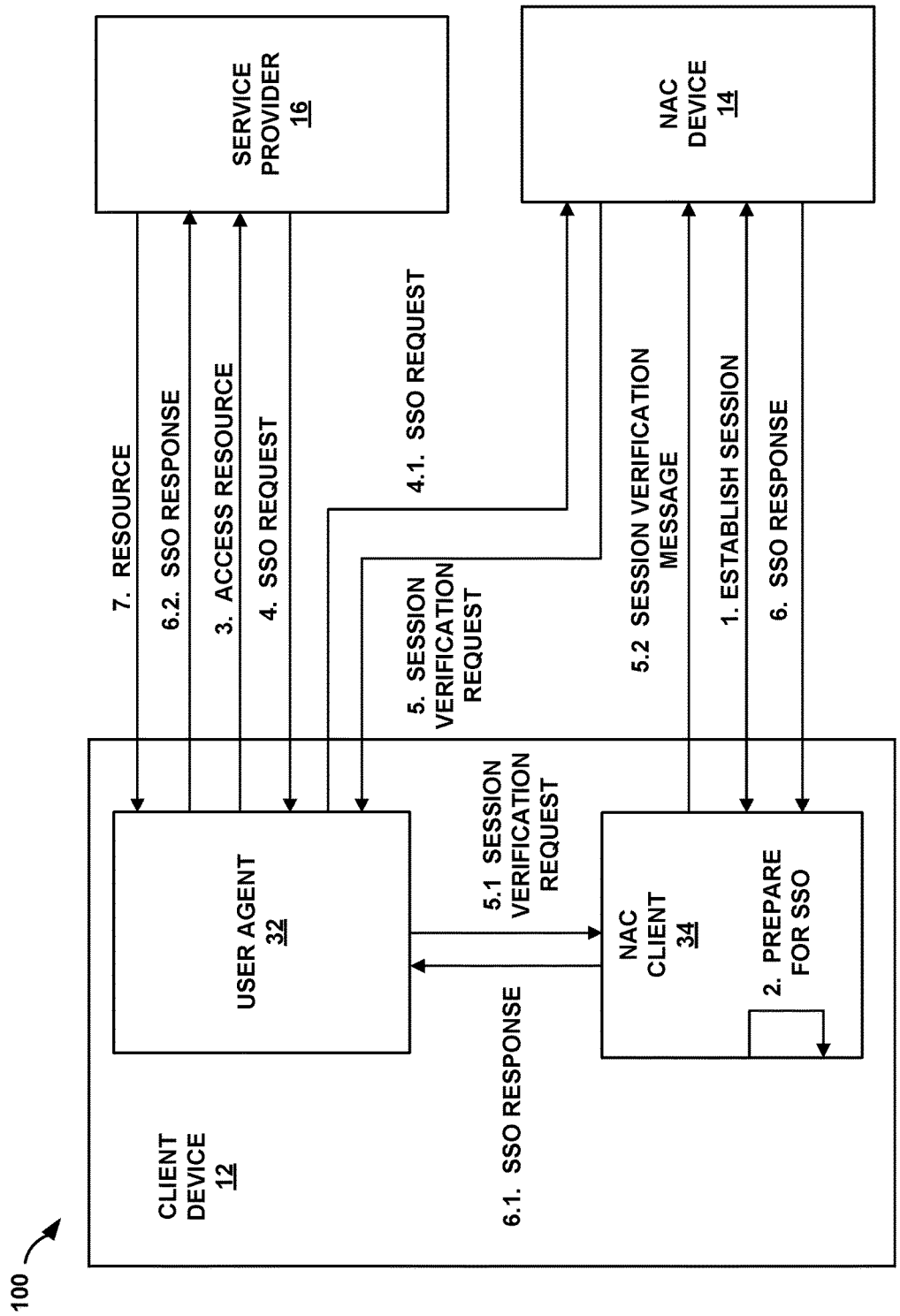
FIG. 4 is a block diagram illustrating another example network environment that may implement the network access session-based security assertion techniques of this disclosure.

FIG. 4 is a block diagram illustrating another example network environment 100 that may implement the session-based security assertion techniques of this disclosure. As shown in FIG. 4, network environment 100 includes a client device 12, a service provider 16, and a NAC device 14.

In some examples, NAC device 14 may act as an SSO identity provider and/or a SAML identity provider. In further examples, user agent 32 may be a web browser.

The pre-configuration of network environment 100 will now be described. NAC device 14 is configured with two different hostnames: (1) the standard hostname, and (2) the alternate hostname. The standard hostname may be used by a user to login to NAC device 14. The alternate hostname may be used by a SAML SSO service. Both hostnames may be available in the DNS, and may map to an IP address of NAC device 14.

The operation of network environment 100 will now be described in the case where a user signs-on to the NAC device 14 to establish a session, and subsequently requests access to a resource that is protected by service provider 16.

Step 1: A user launches NAC client 34 and connects to NAC device 14. The connection is made using the standard hostname. NAC device 14 sends back a session cookie to NAC client 34. NAC device 14 also sends back an alternate hostname.

Step 2: NAC client 34 prepares to handle security assertion requests. For example, NAC client 34 may generate a host file entry in the endpoint device where the host file entry maps the virtual hostname to a loopback address, and NAC client 34 may start listening to the loopback address (e.g., on port 443).

Each of the following requests may, in some examples, be a Hypertext Transfer Protocol Secure (HTTPS) transaction and each of the messages exchanged may, in some examples, be HyperText Markup Language (HTML) messages.

Step 3: A user opens user agent 32 and tries to access a SAML protected resource.

Step 4: Because resource does not have a session with the user, service provider 16 for the resource generates a SAML security assertion request and redirects user to a SAML SSO service executing on NAC device 14. The redirect may redirect the user to the standard hostname of the NAC device 14 and not the alternate hostname so the request directly goes to the NAC device 14.

Step 4.1: The user agent 32 receives the redirect and sends a request to the NAC device 14.

Step 5: NAC device 14 receives the request. NAC device 14 validates the security assertion request and redirects the user to a session detection URL on NAC device 14 with a session verification request. This URL may be hosted on the alternate hostname.

Step 5.1: User agent 32 resolves the alternate hostname. The alternate hostname resolves to a loopback address because the endpoint's host file has been updated in Step 2. User agent 32 connects to NAC client 34 and sends the session verification request. The certificate used by NAC client 34 to do the SSL handshake is either installed offline or is queried by NAC client 34 from the NAC device 14 using the control channel between client and the NAC device 14.

Step 5.2: NAC client 34 verifies that the alternate hostname in the incoming request is the same as the one it is expecting, and if so, creates a new connection to the NAC device 14 on the hostname. NAC client 34 then forwards the session verification request to the NAC device 14. NAC client 34 embeds the session cookie in the session verification request.

Step 6: The NAC device 14 detects the session based on the session cookie and generates the assertion by co-relating the session verification request with the received security assertion request in Step 4.1

Step 6.1: NAC client 34 receives the response and forwards it to user agent 32 after stripping off the session cookie.

Step 6.2: User agent 32 receives the response and posts the response to service provider 16.

Step 7: Service provider 16 grants access to the resource.

Figure 5A:
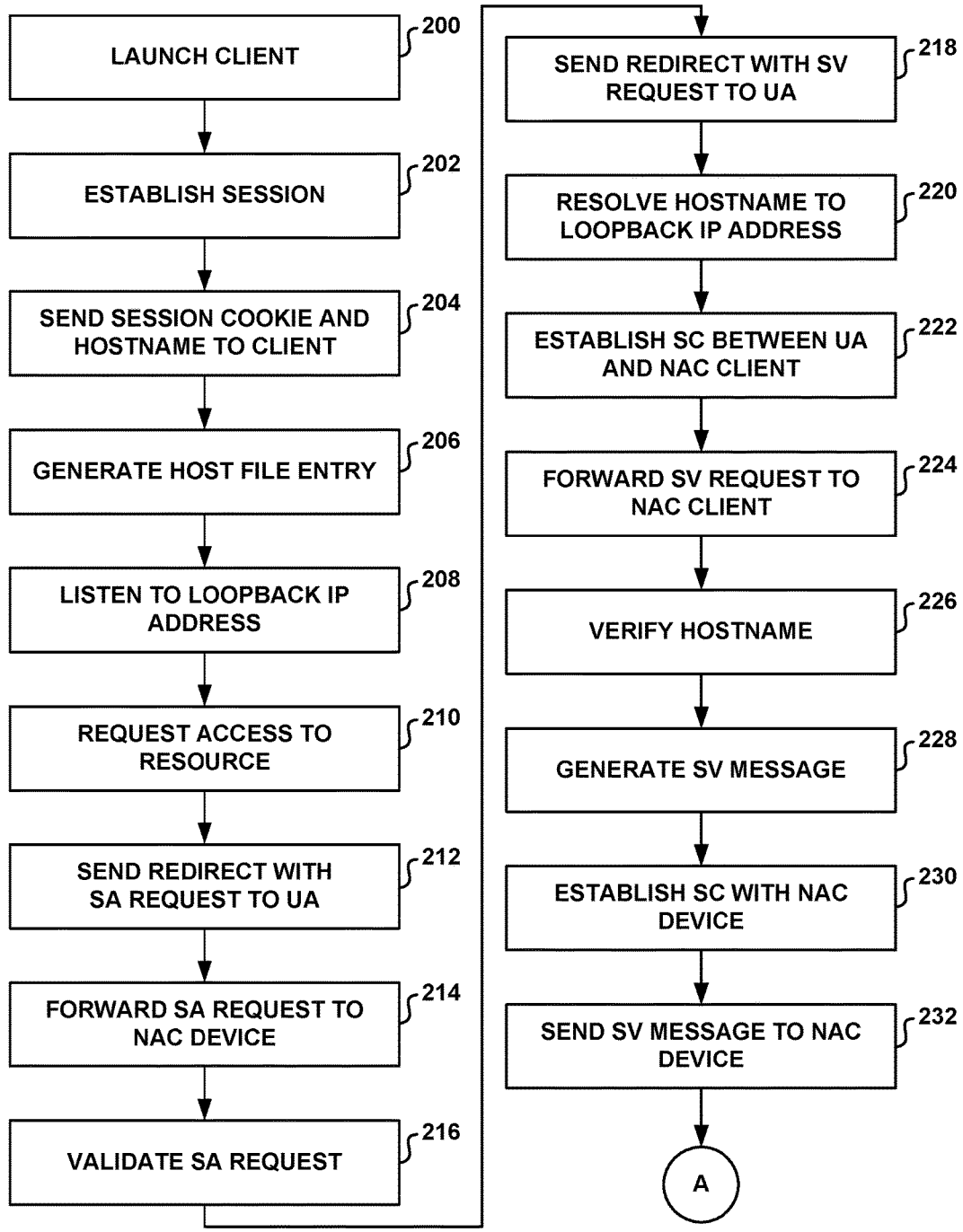
FIGS. 5A-5B are flow diagrams illustrating an example technique for providing network access session-based security assertions according to this disclosure.
Figure 5B:
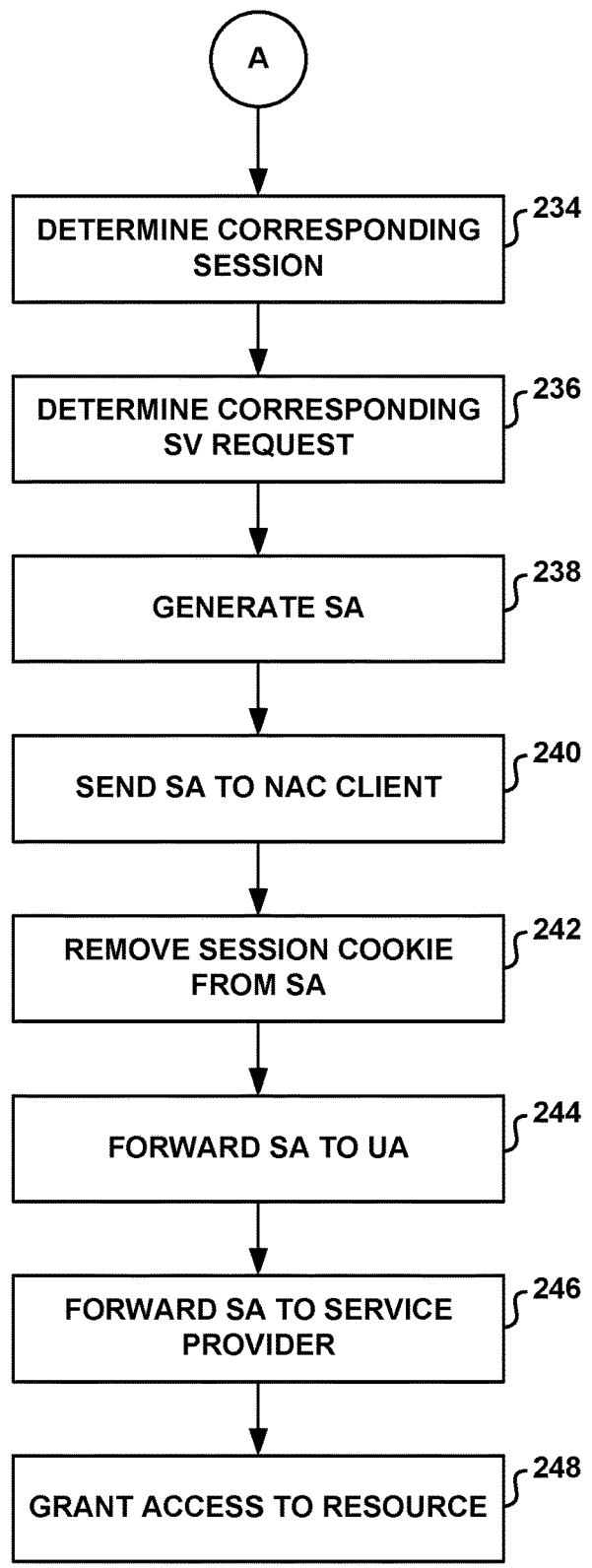

FIGS. 5A-5B are flow diagrams illustrating an example technique for providing network access session-based security assertions according to this disclosure. The technique illustrated in FIGS. 5A-5B may be implemented, in some examples, in any of the network environments shown in FIGS. 1-4.

NAC device 14 may be associated with a standard hostname and an alternate hostname. The standard hostname may be used to access NAC device 14 for purposes other than security assertion requests, and the alternate hostname may be used for receiving redirected session verification requests.

Initially, a user of enterprise network 20 does not have access to one or more resources that are protected by enterprise network 20. To access the resources protected by enterprise network 20, the user launches NAC client 34 to establish a network access session (200). The network access session may refer to a session between NAC client 34 and NAC server 48 that allows the user to access one or more protected network resources on enterprise network 20 associated with NAC device 14. In some examples, NAC client 34 may connect to NAC server 48 via the standard hostname for NAC device 14.

NAC client 34 and NAC device 14 (e.g., NAC server 48) establish a network access session (202). To establish the network access session, NAC server 48 may authenticate the user of NAC client 34. For example, NAC client 34 may request user identity credentials from the user of NAC client 34. The user identity credentials may be any type of credential that allows the identity of the user to be authenticated. For example, the user identity credentials may be a username-password combination. NAC server 48 verifies the user credentials. If the user credentials are valid, NAC server 48 and NAC client 34 establish a network access session.

Upon or after establishment of the network access session, NAC server 48 sends NAC client 34 one or both of session information and an alternate hostname for NAC device 14 (204). The session information may be indicative of the session that was established between the user and NAC device 14. For example, the session information may include a session identifier that uniquely identifies the network access session established between the user and NAC device 14.

In some examples, the session information may be a session cookie that includes information indicative of a session on the NAC device 14. In some cases, the session cookie may include a randomized opaque string of sufficient length which maps to a specific session in the NAC device. This mapping may be invalidated based on timeouts, an explicit logouts, administrator activity, etc. In some examples, the session cookie may be sent by NAC client 34 to NAC device 14 with the requests to enable the NAC device to identify the session. If the cookie is stale or has been invalidated as mentioned above then the session access may be denied.

The alternate hostname may refer to a hostname to which NAC device 14 will send session verification requests in response to receiving security assertion requests. For example, the alternate hostname may be specified as a destination location for a redirect message that is sent by NAC device 14 in response to receiving a security assertion request.

Upon or after establishment of the network access session, NAC client 34 configures client device 12 such that NAC client 34 will receive session verification requests that are sent to client device 12 from NAC device 14. In other words, NAC client 34 may configure client device 12 to forward redirects that are sent to the alternate hostname to NAC client 34.

To configure client device 12 to forward redirects that are sent to the alternate hostname to NAC client 34, NAC client 34 generates a host file entry and places the host file entry into a host file for client device 12 (206). The host file entry may map the alternate hostname to an IP address that is specified by NAC client 34. The IP address specified by NAC client 34 may correspond to a loopback IP address to which NAC client 34 will listen for session verification requests.

Prior to placing the host file entry into the host file for client device 12 (and prior to establishing the network access session), client device 12 may be configured to resolve the alternate hostname to an IP address (e.g., a public IP address) associated with NAC device 14. For example, a DNS system may map the alternate hostname to the IP address associated with NAC device 14, and name resolver 40 may use the DNS system to resolve the alternate hostname to the IP address associated with NAC device 14. In other words, prior to placing the host file entry into the host file for client device 12, the host file may, in some examples, not contain any host file entry that maps the alternate hostname to an IP address.

After placing the host file entry into the host file for client device 12, name resolver 40 may resolve the alternate hostname to the loopback IP address included in the host file. In other words, the mapping for the alternate hostname specified by the host file entry may override the mapping for the alternate hostname included in the DNS system.

After configuring client device 12 to forward redirects that are sent to the alternate hostname to NAC client 34, NAC client 34 listens to the loopback IP address for redirected session verification requests (208). For example, client device 12 may create a socket, bind the loopback IP address to the socket, and listen for incoming connections on the socket.

A loopback IP address may refer to an IP address that corresponds to a virtual network interface that is implemented by software in client device 12. For example, the virtual network interface may be implemented by network communication module 36 of operating system 30. The virtual network interface may allow processes and/or applications to communicate with each other without passing any packets to the network interface controller (IP) and without passing any packets through the network that is external to client device 12. In some examples, network communication module 36 of operating system 30 may pass any traffic that is sent to the loopback IP address back up the network software stack without passing the packets to the network interface card.

Using a loopback IP address to listen for redirected session verification requests may, in some examples, ensure that network traffic associated with the loopback IP does not leave client device 12, thereby avoiding the possibility of any security leak from the system. In addition, because the network traffic associated with the loopback IP address may, in some examples, not travel through the network card, the performance of the system may be improved.

After establishing a network access session with NAC device 14, a user may wish to obtain access to a resource that is protected by a third-party service provider 16. In some examples, the resource may be a SAML-protected resource. To obtain access to such a resource, NAC device 14 opens user agent 32 and requests access to the protected resource (210). For example, user agent 32 may send a request (e.g. request 56—FIG. 2) to service provider 16. The request may include information identify the user of user agent 32 that is making the request.

In response to receiving request, service provider 16 may determine whether the user has a session established with service provider 16. If the user has a session established with service provider 16, then service provider 16 may grant access to the protected resource. Otherwise, service provider 16 may determine that the user is to be authenticated, and send a redirect to user agent 32 (212). The redirect may include a security assertion request, and specify the standard hostname for NAC device 14 as the destination location to which the request made by user agent 32 should be forwarded. In some examples, the security assertion request may be encoded in the destination location as a URL query variable. In some cases, the security assertion request may be referred to as an SSO request.

User agent 32 forwards the security assertion (SA) request included in the redirect to NAC device 14 (214). In examples where the SA request is encoded in the destination location of the redirect, forwarding the security assertion to NAC device 14 may involve sending a message to the destination location specified in the redirect, and NAC device 14 may decode the URL query variable to obtain the SA request. In some examples, the message may include the original message that was sent to service provider 16 (i.e. message 56—FIG. 4). In further examples, the message may correspond to message 60 (FIG. 4).

In response to receiving the SA request, NAC server 48 validates the SA request (216). For example, the SA request may indicate the service provider (e.g., service provider 16) that is requesting the security assertion, and NAC server 48 may verify that it provides identity services for that service provider. In some examples, in addition to or in lieu of verifying that the NAC server 48 provides identity services for that service provider, NAC server 48 may validate any signature in the SA request and/or validate any validations based on time that are mentioned in the request. If the SA request is not valid, then NAC server 48 may return an error message indicating that the security assertion request is invalid.

In some examples, instead of NAC server 48 receiving and processing the SA request, another process or application executing on NAC device 14 may receive and process the SA request. For example, a SSO SAML service may execute on NAC device 14 that is configured to receive and process the SA request. In further examples, NAC server 48 may be configured to act as a SSO SAML service.

If the SA request is valid, NAC server 48 sends a redirect to user agent 32 (218). The redirect may include a session verification (SV) request, and specify the alternate hostname for NAC device 14 as the destination location to which the request made by user agent 32 should be forwarded. In some examples, the SV request may be encoded in the destination location as a URL query variable. The SV request may include information indicative of the security assertion request.

In some examples, the information indicative of the security assertion request may include a randomized opaque string that maps to the SA request received by NAC device 14. In some cases, after validating the SA request, NAC device 14 may store the information and provide a reference to that in the SV request. In some examples, the mapping may be valid for a relatively short time duration, and NAC device 14 may invalidate the mapping if no SA is generated by NAC device 14 within that time duration. In further examples, NAC device 14 may invalidate the mapping immediately after SA is generated by NAC device 14 so that second SA cannot be generated using the same reference.

In response to receiving the redirect, name resolver 40 may resolve the alternate hostname included in the destination location of the redirect to the loopback IP address (220). User agent 32 may establish a secure connection (SC) between user agent 32 and NAC client 34 (222). In some examples, the secure connection may be an SSL connection, and user agent 32 may perform an SSL handshake to establish the secure connection. The certificate used by NAC client 34 to perform the SSL handshake may be installed offline or may be queried by NAC client 34 from NAC server 48 using the control channel between NAC client 34 and NAC server 48 that was established when the network access session was established.

User agent 32 forwards the SV request to NAC client 34 via the secure connection established between user agent 32 and NAC client 34. In examples where the SV request is encoded in the destination location of the redirect, forwarding the SV to NAC client 34 may involve sending a message to the destination location specified in the redirect, and NAC client 34 may decode the URL query variable to obtain the SV request. In some examples, the message may include the original message that was sent to NAC server 48 (i.e.

message 60—FIG. 4). In further examples, the message may correspond to message 64 (FIG. 4).

In response to receiving the SV request, NAC client 34 verifies the alternate hostname included in the destination location of the SV request (226). For example, NAC client 34 verifies that the alternate hostname included with the SV request matches the alternate hostname that was received by NAC client 34 when the network access session was established. If the alternate hostname included with the SV request does not match the alternate hostname that was received by NAC client 34 when the network access session was established, then NAC client 34 may reject the request as an invalid request.

If the alternate hostname included with the SV request does match the alternate hostname that was received by NAC client 34 when the network access session was established, then NAC client 34 may generate an SV message (228). NAC client 34 may generate the SV message such that the SV message includes information indicative of the security assertion request associated with the SV request and session verification information associated with the session that was established between the user and NAC device 14. The information indicative of the security assertion request may correspond to or be generated based on the information indicative of the security assertion request that was received in the SV request. In some examples, information indicative of the security assertion request may include a randomized string which maps to the SA request received and verified by NAC device 14.

In some examples, the session verification information may be a session cookie that includes information indicative of the session established between the user and NAC device 14. In some examples, the session cookie may be a randomized opaque string mapping to the user session in NAC device 14.

NAC client 34 may establish a secure connection (SC) between NAC client 34 and NAC device 14 (230), and sends the SV message to NAC device 14 via the secure connection (232). NAC client 34 may use the standard hostname for NAC device 14 to establish the connection. In some examples, the secure connection may be an SSL connection, and NAC client 34 may perform an SSL handshake with NAC server 48 to establish the secure connection. The certificate used by NAC client 34 to perform the SSL handshake may be installed offline or may be queried by NAC client 34 from NAC server 48 using the control channel between NAC client 34 and NAC server 48 that was established when the network access session was established.

In response to receiving the session verification message, NAC server 48 correlates the security assertion request associated with the SV message with a session associated with the SV message. For example, NAC server 48 determines the session that corresponds to the SV message based on the information indicative of the session (e.g., the session cookie) (234). NAC server 48 determines the security assertion request that corresponds to the SV message based on the information indicative of the security assertion request (236). NAC server 48 may further determine a user associated with the session.

Based on this information, NAC server 48 determines that the user has established a network access session with NAC device 14. Therefore, NAC server 48 generates a security assertion (SA) (238). NAC server 48 sends the SA to NAC client 34 via the secure connection (240). In some examples, the security assertion may include signed data which contains information regarding user identity and attributes. In further examples, the security assertion may correspond to security assertion 68 described above with respect to FIG. 2. In additional examples, the security assertion may further include a session cookie.

In response to receiving the SA from NAC server 48, NAC client 34 may remove the session cookie from the SA (242), and forward the SA to user agent 32 via the secure connection between NAC client 34 and user agent 32 (244). User agent 32 forwards the SA to service provider 16 (246), and service provider 16 grants access to the resource for the user based on the SA (248).

Figure 6:
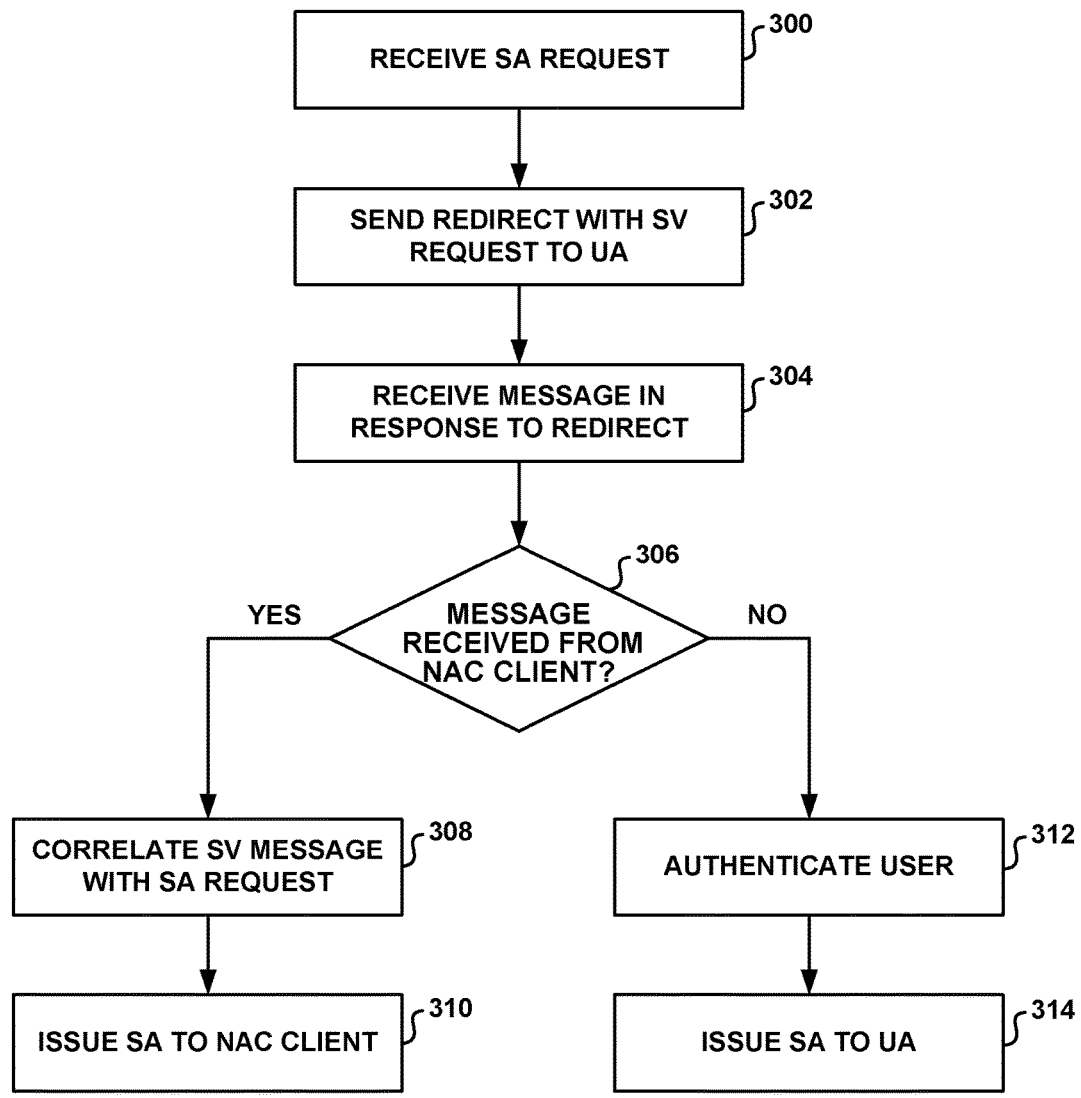
FIG. 6 is a flow diagram illustrating another example technique for providing network access session-based security assertions according to this disclosure.

FIG. 6 is a flow diagram illustrating another example technique for providing network access session-based security assertions according to this disclosure. The technique illustrated in FIG. 6 may be implemented, in some examples, in any of the network environments shown in FIGS. 1-4. In some examples, the technique illustrated in FIG. 6 may implement all or a part of the technique illustrated in FIG. 5.

NAC device 14 receives a security assertion request from user agent 32 (300). NAC device 14 sends a redirect to user agent 32 executing on client device 12 in response to receiving the security assertion request (302). The redirect may include a session verification (SV) request, which may include information indicative of the security assertion request that was received.

NAC device 14 may receive a message in response to the redirect (304). In some examples, the received message may be a session verification (SV) message that is received from NAC client 34. In some cases, the SV message may be responsive to the SV request, and both the SV message and the SV request may correspond to and include information indicative of the same security assertion request.

In further examples, the received message may be a response to the redirect that is received from user agent 32. In some cases, the response to the redirect may correspond to, be similar to, or be identical with the security assertion that was received in process box 300.

NAC device 14 determines whether the received message is a session verification (SV) message that was received from NAC client 34 executing on client device 12 (306). If the received message is a session verification message that was received from NAC client 34, then NAC device 14 correlates the session associated with the SV response to the SA request that corresponds to SV message (308), and issues an SA to NAC client 34 (308). The SA may be responsive to the SA request. If the received message is not a session verification message that is received from NAC client 34, then NAC device 14 authenticates the user of user agent 32 (312), and issues an SA to user agent 32. The SA may be responsive to the SA request in response to successfully authenticating the user (314).

In some cases, if the received message is not a session verification message that is received from NAC client 34, the received message may be a response to the redirect that was received from user agent 32. In such cases, decision block 306 may correspond to determining whether the received message is a session verification message that was received from NAC client 34 or whether the received message is a response to the redirect that was received from user agent 32.

If a network session has not been established, then client device 12 may resolve the alternate hostname in the redirect to the public IP address associated with NAC device 14. In such cases, NAC device 14 may receive a response to the redirect from user agent 32 instead of receiving a session verification message from NAC client 34. In such cases, receiving a response to the redirect from user agent 32 operates as an indication to NAC device 14 that the user has not been authenticated.

Figure 7:
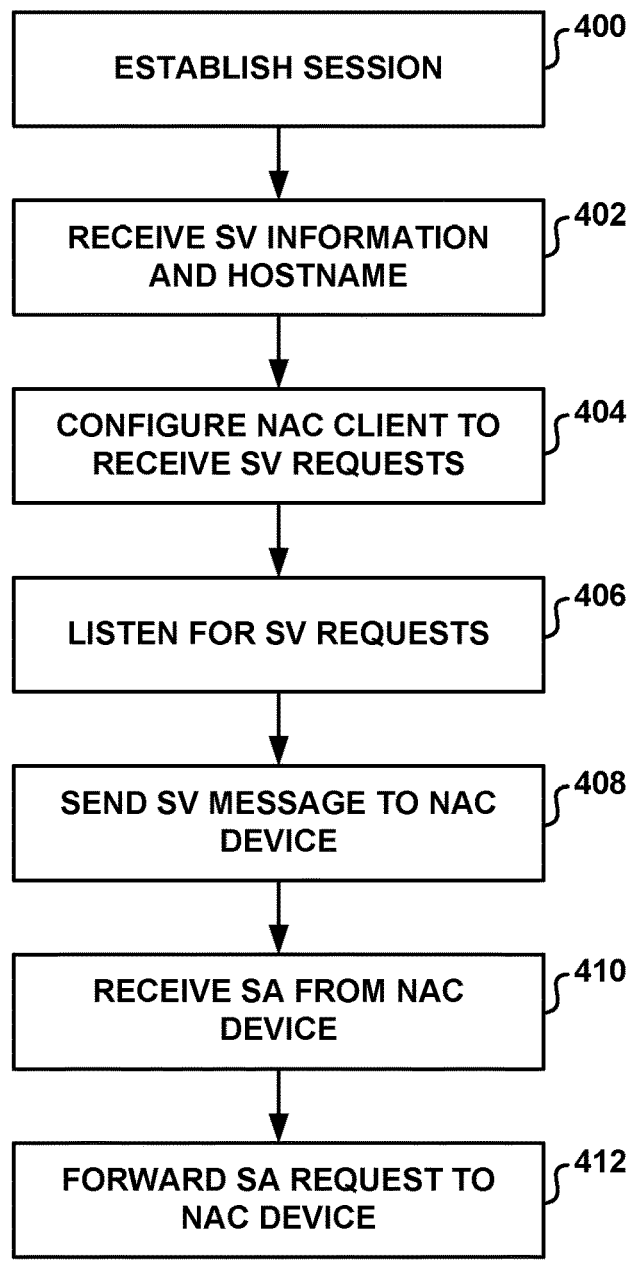
FIG. 7 is a flow diagram illustrating another example technique for providing network access session-based security assertions according to this disclosure.

FIG. 7 is a flow diagram illustrating another example technique for providing network access session-based security assertions according to this disclosure. The technique illustrated in FIG. 7 may be implemented, in some examples, in any of the network environments shown in FIGS. 1-4. In some examples, the technique illustrated in FIG. 7 may implement all or a part of the technique illustrated in FIG. 5.

NAC client 34 establishes a network access session between a user of NAC client 34 and NAC device 14 (400). NAC client 34 receives session verification information (e.g., information indicative of the session or a session cookie) from NAC server 48 (402). NAC client 34 configures itself to receive SV requests (404). For example, NAC client 34 creates a host file entry that maps an alternate hostname for NAC device 14 to a loopback IP address for client device 12. NAC client 34 listens to the loopback IP address for SV requests (406).

In response to receiving an SV request, NAC client 34 sends an SV message to NAC device 14 (408). In some examples, NAC client 34 may add the SV information to the SV request. For example NAC client 34 may add a session cookie to the SV request.

NAC client 34 receives a SA from NAC device 14 (410). In response to receiving the SA, NAC client 34 forwards the SA to user agent 32. In examples where the security assertion includes a session cookie, NAC client 34 may, in some examples, remove the session cookie from the SA prior to forwarding the SA.

As shown in FIGS. 5A and 5B, NAC client 34 may establish a network access session between a user of a network associated with the NAC client 34 and the NAC device 14 (e.g., NAC server 48) (202). NAC client 34 may configure the client device to resolve a hostname to an internet protocol (IP) address in response to establishing the network access session (204, 206). NAC client 34 may listen to the IP address (208). In some examples, the IP address is a loopback IP address.

NAC device 14 (e.g., NAC server 48) may receive a security assertion request from a user agent executing on the client device (212). The security assertion request may include a request for a security assertion to be made by NAC device 14. The security assertion may indicate that a user of the user agent has been authenticated by the NAC device 14.

NAC device 14 (e.g., NAC server 48) may send a redirect to user agent 32 in response to receiving the security assertion request. The redirect may include a session verification request that includes information indicative of the security assertion request. The redirect message may specify that the redirect message is to be redirected to the hostname. Client device 12 (e.g., name resolver 40) may resolve the hostname to the IP address. User agent 32 may forward the session verification request included in the redirect to the IP address.

NAC client 34 may send a session verification message to NAC device 14 in response to receiving the session verification request at the IP address. The session verification message may include the information indicative of the security assertion request and session verification information that is indicative of a session that has been established between the user and the NAC device 14. NAC device 14 (e.g., NAC server 48) may send a security assertion responsive to the security assertion request to NAC client 34 in response to receiving the session verification information from NAC client 34. NAC client 34 may forward the security assertion to user agent 32 executing on client device 12.

As shown in FIGS. 5-6, NAC device 14 may receive a security assertion request from a user agent 32 executing on a client device (300). The security assertion request may include a request for a security assertion to be made by NAC device 14. The security assertion may indicate that a user of user agent 32 has been authenticated by NAC device 14.

NAC device 14 may send a redirect to user agent 32 in response to receiving the security assertion request (302). The redirect may include information indicative of the security assertion request. NAC device 14 may selectively issue a security assertion that is responsive to the security assertion request without requiring the user to re-authenticate with NAC device 14 based on whether NAC device 14 receives session verification information from an NAC client 34 executing on the client device in response to sending the redirect to user agent 32 (304, 306, 308, 310, 312, 314).

In some examples, to selectively issue the security assertion, NAC device 14 may issue the security assertion without requiring the user to re-authenticate with NAC device 14 in response to NAC device 14 receiving the session verification information from NAC client 34 (240; 310), authenticate the user in response to NAC device 14 not receiving the session verification information from NAC client 34 (312), and issue the security assertion for the user in response to successfully authenticating the user when NAC device 14 does not receive the session verification information from NAC client 34 (314).

In further examples, to selectively issue the security assertion, NAC device 14 may selectively issue the security assertion that is responsive to the security assertion request without requiring the user to re-authenticate with NAC device 14 based on whether NAC device 14 receives the session verification information from NAC client 34 in response to sending the redirect message to user agent 32 and whether NAC device 14 receives a response to the redirect from user agent 32 (304, 306, 308, 310, 312, 314).

In such examples, NAC device 14 may, in some examples, issue the security assertion without requiring the user to re-authenticate with NAC device 14 in response to NAC device 14 receiving the session verification information from NAC client 34 (310), authenticate the user in response to NAC device 14 receiving the response to the redirect from user agent 32 (312), and issue the security assertion for the user in response to successfully authenticating the user when NAC device 14 receives the response to the redirect from user agent 32 (314).

In some examples, NAC device 14 may send the security assertion to NAC client 34 when NAC device 14 receives the session verification information from NAC client 34 (310), and send the security assertion to user agent 32 when NAC device 14 receives a response to the redirect from user agent 32 (314).

In some examples, to selectively issue the security assertion, NAC device 14 may receive a session verification message from NAC client 34 in response to sending the redirect message to user agent 32 (232; 304). The session verification message may include the information indicative of the security assertion request and the session verification information. In such examples, NAC device 14 may determine that the session verification message corresponds to the security assertion request based on the information indicative of the security assertion request included in the session verification message (236; 308), and NAC device 14 may issue the security assertion that is responsive to the security assertion request without requiring the user to re-authenticate with NAC device 14 in response to determining that the session verification message corresponds to the security assertion request (238, 240; 310).

In some examples, to selectively issue the security assertion, NAC device 14 may receive a session verification message from NAC client 34 in response to sending the redirect message to user agent 32 (232). The session verification message may include the information indicative of the security assertion request and the session verification information. In such examples, NAC device 14 may determine that the session verification message corresponds to the security assertion request based on the information indicative of the security assertion request included in the session verification message (236; 308), determine that the user has a network access session established between the user and NAC device 14 based on the session verification information (308); and issue the security assertion for the user that is responsive to the security assertion request without requiring the user to re-authenticate with NAC device 14 in response to determining that the user has the network access session established between the user and NAC device 14 (238, 240; 310).

In some examples, to determine that the user has the network access session established between the user and NAC device 14, NAC device 14 may determine a session that corresponds to the session verification message based on the session verification information (234; 308), determine that the user that is associated with the session has the network access session established between the user and NAC device 14 (308), and generate the security assertion such that the security assertion includes information that identifies the user and a statement that indicates that the user has authenticated with NAC device 14 (238, 240; 310).

In further examples, the security assertion request may be generated by service provider 16 and sent by service provider 16 to user agent 32 in response to user agent 32 requesting access to a resource provided by service provider 16. In such examples, user agent 32 may forward the security assertion request to NAC device 14.

In some examples, user agent 32 is a web-browser. In further examples, user agent 32 comprises a Hypertext Transfer Protocol (HTTP) user agent.

In some examples, the redirect message may specify that the redirect message is to be redirected to a hostname that is pre-negotiated between NAC device 14 and NAC client 34. In further examples, the redirect message may specify that the redirect message is to be redirected to a hostname. In such examples, the hostname may be resolved by client device 12 to an internet protocol (IP) address that is listened to by NAC client 34 when the network access session has been established between the user and NAC device 14. In some examples, the IP address is a loopback IP address. In further examples, the hostname may be resolved to an IP address associated with NAC device 14 when the network access session has not been established between the user and NAC device 14.

In some examples, NAC device 14 may establish a network access session between the user and NAC device 14 via NAC client 34 (202), and send a hostname to NAC client 34 in response to establishing the network access session, wherein the redirect message specifies that the redirect message is to be redirected to the hostname (204).

As shown in FIG. 6, NAC client 34 may listen to an internet protocol (IP) address for a session verification request (406), and may send a session verification message to NAC device 14 in response to receiving the session verification request at the IP address (410).

The session verification request may include information indicative of a security assertion request. The security assertion request may include a request for a security assertion to be made by NAC device 14. The security assertion may indicate that a user has been authenticated by NAC device 14. The session verification message may include the information indicative of a security assertion request and session verification information that is indicative of a session that has been established between the user and NAC device 14. In some examples, the IP address is a loopback IP address.

In some examples, NAC client 34 may establish a network access session between the user and NAC device 14 (400), receive a hostname from NAC device 14 in response to establishing the network access session (402), and configure client device 12 to resolve the hostname to the IP address in response to receiving the hostname (404).

In further examples, client device 12 is configured to resolve the hostname to an IP address associated with NAC device 14 prior to establishing the network access session between the user and NAC device 14.

In some examples, NAC client 34 may receive a security assertion from NAC device 14 in response sending the session verification message to NAC device 14 (410), and forward the security assertion to the user agent executing on the client device 12 (412).

As per the SAML standard based Service Provider (SP) Initiated [Destination first] scenario, if a user attempts to directly access SAML protected web resource (e.g., the user is on a cloud) then the resource redirects the user to an Identity Provider (IdP) for getting authenticated and henceforth receives an assertion indicating the authentication status and other parameters (if any). Depending on the assertion received, the SAML protected web resource grants access to the user.

Consider a case when the user has launched an NAC client for 802.1x authentication and L3 authentication, which may run as separate applications (e.g., detached from the browser). If the network access device acts as an IdP for a web resource which the user is accessing, then the browser may not be aware of the client sessions running and the user would be prompted to re-authenticate again, even though he may have already authenticated while connecting via the NAC client.

The techniques of this disclosure may, in some examples, allow an NAC device to act as an identity provider to provide single sign-on (SSO) functionality. For example, an NAC device may, in response to receiving a security assertion request for a user, verify the identity of the user based on whether the user associated with a security assertion request has a valid network access session established with the NAC device. In some examples, the techniques of this disclosure may provide session detection for non-tunneled sessions (e.g., non-tunneled network access sessions) such as, e.g., a Pulse session established with a Unified Access Control (UAC) device.

In some examples, a NAC device may redirect an SAML security assertion request to a virtual hostname and an NAC client executing on a client device may listen on a loopback address and generate a host entry in the client machine for the virtual hostname to resolve to the loopback address. This may allow the SAML security assertion request to be received by the NAC client. Once the NAC client receives the request, the client may insert the session cookie in the request and send the request to the NAC device. The NAC device may identify the session based on the cookie, and initiate an SSO.

In some examples, a DNS entry may be made in a public DNS for the alternate hostname, so that even if NAC client 34 is not executing on client device 12, the user may be redirected to the alternate hostname of NAC device 14, thereby allowing web authentication and subsequent SSO to take place.

Currently, despite having an authenticated session with an NAC device, a user may have to authenticate to individual web resources to gain access to those resources. Using the techniques of this disclosure, web resources supporting SAML SSO may, in some examples, not require the user to authenticate once they have a valid session with NAC device.

Various embodiments of the invention have been described. These and other embodiments are within the scope of the following claims.

What is claimed is:

1. A method comprising:
    establishing, with a network access control (NAC) client executing on a client device, a network access session between a user of a network associated with the NAC client and the NAC device;
    configuring, with the NAC client, the client device to resolve a hostname to an internet protocol (IP) address in response to establishing the network access session;
    listening, with the NAC client, to the IP address;
    receiving, with the NAC device, a security assertion request from a user agent executing on the client device, the security assertion request including a request for a security assertion to be made by the NAC device, the security assertion indicating that a user of the user agent has been authenticated by the NAC device;
    sending, with the NAC device, a redirect to the user agent in response to receiving the security assertion request, the redirect including a session verification request that includes information indicative of the security assertion request, the redirect message specifying that the redirect message is to be redirected to the hostname;
    resolving, with the client device, the hostname to the IP address;
    forwarding, with the user agent executing on the client device, the session verification request included in the redirect to the IP address;
    sending, with the NAC client, a session verification message to the NAC device in response to receiving the session verification request at the IP address, the session verification message including the information indicative of the security assertion request and session verification information that is indicative of a session that has been established between the user and the NAC device;
    sending, with the NAC device, a security assertion responsive to the security assertion request to the NAC client in response to receiving the session verification information from the NAC client; and
    forwarding, with the NAC client, the security assertion to the user agent executing on the client device.

2. The method of claim 1, wherein the IP address is a loopback IP address.

* * * * *